United States Patent [19]
Redman et al.

[11] Patent Number: 5,500,729
[45] Date of Patent: Mar. 19, 1996

[54] MAGNETO-OPTICAL ARRANGEMENT FOR LASER RADAR

[75] Inventors: Brian C. Redman, Alexandria; Dallas N. Barr, Woodbridge; John E. Nettleton, Fairfax Station, all of Va.

[73] Assignee: The United States of America as represented by the Secretary of the Army, Washington, D.C.

[21] Appl. No.: 307,214

[22] Filed: Sep. 16, 1994

[51] Int. Cl.$^6$ .................................................. G01C 3/08
[52] U.S. Cl. .................................. 356/5.09; 356/28.5
[58] Field of Search ............................ 356/5.09, 5.1, 356/5.14, 5.15, 28.5; 359/346, 337; 372/106, 98

[56] References Cited

U.S. PATENT DOCUMENTS

| | | | |
|---|---|---|---|
| 3,733,129 | 5/1973 | Bridges | 356/5 |
| 4,405,230 | 9/1983 | Tew et al. | 356/5 |
| 4,824,240 | 4/1989 | Myers | 356/4.5 |
| 5,069,545 | 12/1991 | Hinz | 356/28.5 |
| 5,276,549 | 1/1994 | Tagawa et al. | 359/341 |

*Primary Examiner*—Mark Hellner
*Attorney, Agent, or Firm*—Milton W. Lee; John E. Holford; Alain L. Bashore

[57] ABSTRACT

The heterodyne detection efficiency of coherent laser radars is maximized by coaxially aligning the local oscillator (LO) beam and the received laser beam when combined at the detector by preventing interference between the counter-propagating waves in the lasing rod within the lasing cavity by using optic polarization, magneto-optic polarization, and cavity end partial reflectors.

2 Claims, 2 Drawing Sheets

MAGNETO-OPTICAL ARRANGEMENT FOR LASER RADAR

BACKGROUND OF THE INVENTION

1. Field of the Invention

The present invention generally relates to laser resonator cavity configurations and more specifically, to a beam alignment sensitivity and multi-moding elimination configuration and technique for laser resonator cavities.

2. Description of Prior Art

In order to maximize the efficiency of heterodyne detection when utilizing coherent lasers, the local oscillator (LO) beam and the received laser radiation should be aligned coaxially when combined at the detector. In laser radars of the prior art this alignment has been accomplished using beam splitters. In these traditional arrangements, alignment of the beam splitters is critical and very little misalignment can be tolerated without a drastic reduction in mixing efficiency. With the relatively recent advent of solid state near infrared (NIR) coherent laser radars it has been possible to replace the beam splitters by single mode fiber optic couplers which automatically maintains alignment between the two coupled beams. This arrangement transfers the alignment point to a point where the beams are coupled into the fiber optic. This arrangement is much less sensitive to misalignments than the beam splitter arrangements, but it is not completely alignment insensitive.

Another problem encountered in coherent laser radar transmitter design is multi-moding. Heterodyne mixing efficiency is maximum for the case of the LO and received beams corresponding to the same single longitudinal-transverse mode. For a single resonator longitudinal-transverse mode there are nodal regions where little stimulated emission occurs and the gain remains high due to interference between counterpropagating waves. These nodal regions may support laser action for other resonant cavity modes. When this occurs the output of the laser is multi-mode and not useful for coherent laser radar applications.

While the prior art has reported using techniques which maximize efficiency for laser radar, none have established a basis for a specific apparatus that is dedicated to the task of resolving the particular problem at hand. What is needed in this instance is a laser resonator cavity configuration that eliminates multi-moding and where the LO and received beam are alignment insensitive.

SUMMARY OF THE INVENTION

It is therefore one object of the invention to provide a laser resonator cavity configuration and technique that eliminates multi-moding and where the LO and received beam are alignment insensitive.

According to the invention, a laser resonator cavity configuration and technique is disclosed for the substantial elimination of multi-moding and resulting in a local oscillator (LO) and received beam alignment insensitivity. Pump energy is applied to a lasing rod within a resonator cavity to produce an unpolarized spontaneous emission in all directions. Polarizers are utilized to polarize the unpolarized spontaneous emission in a first direction. The polarizer waves are partially reflected toward opposite directions by cavity reflectors and passed back through its respective polarizer without any change in polarization state as a counterpropagating wave. All radiation not polarized in the first direction is reflected out of the resonator cavity. Magneto-optic polarization rotators rotate each counterpropagating wave in a polarization direction by 45 degrees to the perpendicular of the optical axis such that the counterpropagating waves' direction of polarization are still crossed with respect to each other. Each resultant counterpropagating wave which stimulates laser emission that is co-polarized with, and propagating in the same direction, as the stimulating wave, as each wave propagates through the laser rod, and as the resultant counterpropagating wave propagates towards an end reflector. The resultant wave propagates through the magneto-optic polarization rotator which rotates the polarization by 45 degrees so that each waves polarization is in the first direction for transmission through the polarizer.

The laser resonator cavity of the present invention is utilized in a described embodiment as a master oscillator which functions as the master oscillator seed for injection locking a pulsed power amplifier in a master oscillator power amplifier configuration.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
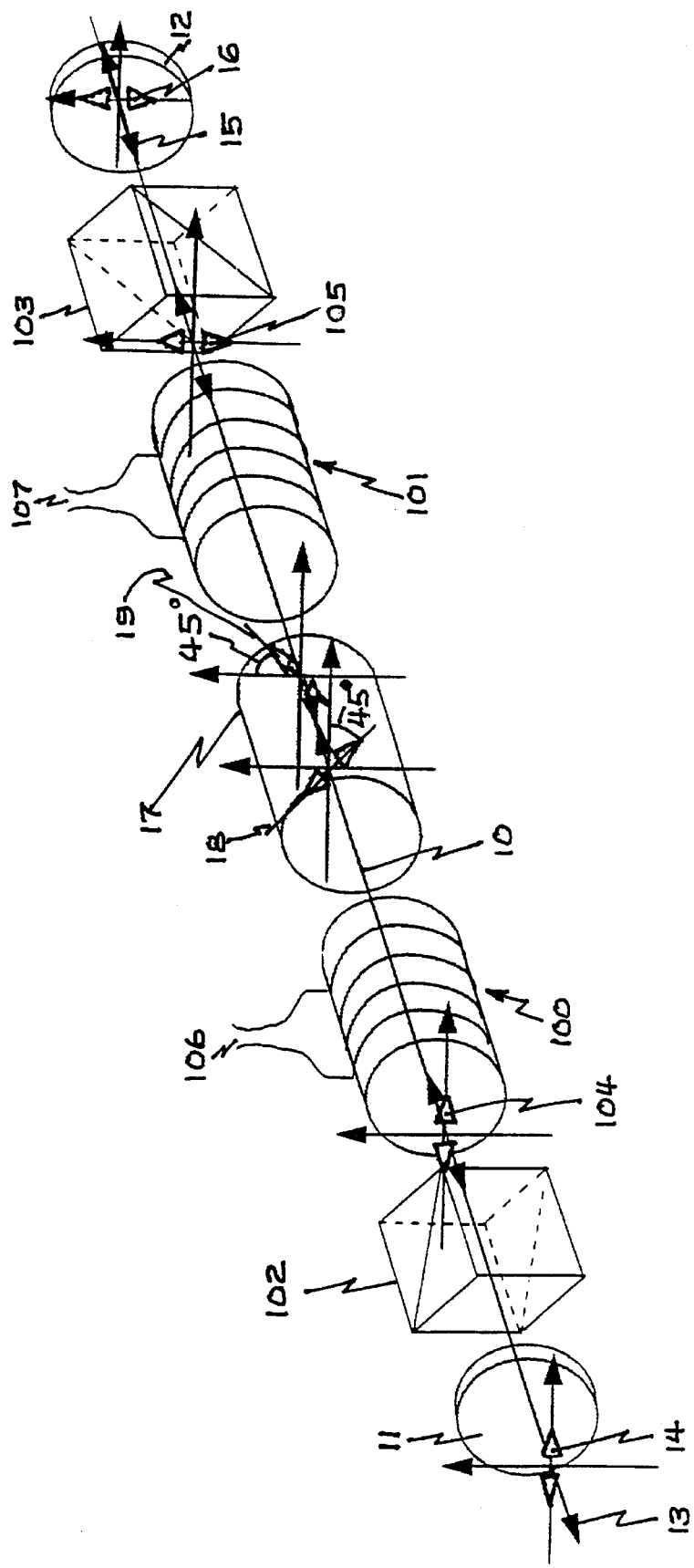
FIG. 1 is a laser resonator cavity configuration utilizing the present invention.

Referring now to the drawings, and more particularly to FIG. 1, there is shown a laser resonator cavity configuration of the present invention along a direction of propagation 10. Partial mirrors 11 and 12 define a resonator cavity utilizing magneto-optic polarization control. LO and received beams 13 are emitted from one end of the cavity at polarization direction 14. Transmitted and received beams 15 are emitted from the other cavity end at polarization direction 16. Laser rod 17 emits laser radiation when pumped by diode lasers or a flash lamp producing counterpropagating waves within the resonator cavity each with respective polarization directions 18 and 19. Faraday rotators 100 and 101 are designed to rotate the respective polarization directions by 45 degrees of the pumped laser beam on each pass so that the total rotation on one round-trip through the cavity is 90 degrees. Polarizers 102 and 103 thus see respective polarization directions 104 and 105 which are counterpropagating. Faraday effect magneto-optic polarization rotators (100 & 101) are commercially available from many companies, e.g., Optics for Research (OFR) for most laser wavelengths from UV through mid-IR and at 10.6 um. Constant fixed rotation by 45° devices are made for optical isolation applications. Power handling capabilities range from 50 MW/cm$^2$ to 300/MW/cm$^2$. The devices are anti-reflection coated to minimize surface reflection losses.

In the operation of the invention shown in FIG. 1 the following steps occur:

a) The laser rod is pumped to produce a population inversion.

b) The unpolarized spontaneous emission from the laser rod occurs and propagates in all directions.

c) The spontaneous emission propagating toward end reflector 11 is polarized in direction 104 by polarizer 102. Radiation not polarized in direction 104 is reflected out of the resonator cavity by polarizer 102. (Note: propagation of the unpolarized spontaneous emission through the magneto-optic polarization rotator does not alter the unpolarized state of the spontaneous emission radiation).

d) The spontaneous emission propagating toward end reflector 12 is polarized in direction 105 by polarizer 103. Radiation not polarized in direction 105 is reflected out of the resonator cavity by polarizer 103.

e) The polarized waves produced in steps c and d are partially reflected toward the opposite directions by the cavity end reflectors 11 and 12, respectively, without altering the waves polarization direction.

f) Each of these counterpropagating waves passes back through its respective polarizer (102 and 103) without any change in its polarization state. The polarization state of each counterpropagating wave is crossed with respect to the other.

g) Each counterpropagating wave passes through a magneto-optic polarization rotator (100 and 101, respectively) which rotates each wave's polarization direction by 45° to the directions 18 and 19, respectively. Thus, the counterpropagating waves' directions of polarization are still crossed with respect to each other.

h) Each counterpropagating wave stimulates laser emission that is co-polarized with and propagating in the same direction as the stimulating wave as each wave propagates through laser rod 17. Since the counterpropagating waves are cross polarized, they do not interfere to produce nulls in the spatial distribution of the intensity within the laser rod.

i) The wave polarized in direction 19 propagating towards end reflector 11 passes through the magneto-optic polarization rotator 100 which rotates the polarization by 45° so that the wave's polarization is in the correct direction for transmission through polarizer 102, i.e., direction 104. Similarly, the wave polarized in direction 18 propagating towards end reflector 12 passes through the magneto-optic polarization rotator 101 which rotates the polarization by 45° so that the wave's polarization is in the correct direction for transmission through polarizer 103, i.e., direction 105.

j) The process then repeats from step e, building up laser emission in the resonator cavity as long as the gain in the laser rod is greater than cavity losses.

By using a transverse DC magnetic field to saturate the magnetization of the ferromagnetic crystal in the direction of the DC field and current carrying coil (or solenoid) 106 and 107 around the ferromagnetic crystal to produce a longitudinal magnetic field, the angle of polarization rotation can be modulated by modulating the voltage applied across coil 106 and 107. It is resonable to envision the operation of the modulator within the KHz range of up to 10 KHz. The Faraday effect magneto-optic modulators in the laser resonator cavity can be used to amplitude modulate the laser output and/or to Q-switch the laser resonator cavity to produce high peak power, short pulse output.

The counterpropagating waves shown in FIG. 1 with propagating directions 14 and 16 will be thus polarized perpendicular to each other, and will not, therefore, interfere to produce intensity nodes in the resonator cavity. The elimination of the interference between the counterpropagating waves in the resonator cavity is a major advantage of the present configuration over the prior art. Reciprocity for the transmitted and received beam 15 assures automatic co-alignment of the individual transmitted beam and received beam in the present invention since both beams share the same optical path. Since the LO and transmitted beams 13 are produced in the same resonator, they are automatically co-aligned throughout the resonator cavity. Thus, when the received beam returns through the resonator, it will emerge at the other end automatically co-aligned with the LO beam as desired. Moreover, the configuration depicted in FIG. 1 also assures that the LO and received beams are copolarized at the detector as required for maximum heterodyne efficiency.

Since the same laser is used to generate the LO and transmitted beams, the resonator cavity disclosed is a homodyne system. Offset homodyne operation can be achieved by placing an electro-optical or acousto-optical frequency shifter after the laser in the transmitted/received beam path to produce a fixed frequency offset between the received beam and the LO beam. Note that the frequency offset will be at twice the frequency of the signal generator driving the frequency shifter since the outgoing and received beams both pass through the frequency shifter.

An advantage of the laser's use of Faraday rotators, rather than prior art waveplates and polarizers is that they allow a user to control electronically a rapid (limited by the induction of the magnetic coil) amplitude modulation of the laser output. Such modulation would be useful for such applications of the configuration as range imaging and communications. The electro-optic or acousto-optic frequency shifters for offset homodyne operation can also be useful for range imaging and communications.

Figure 2:
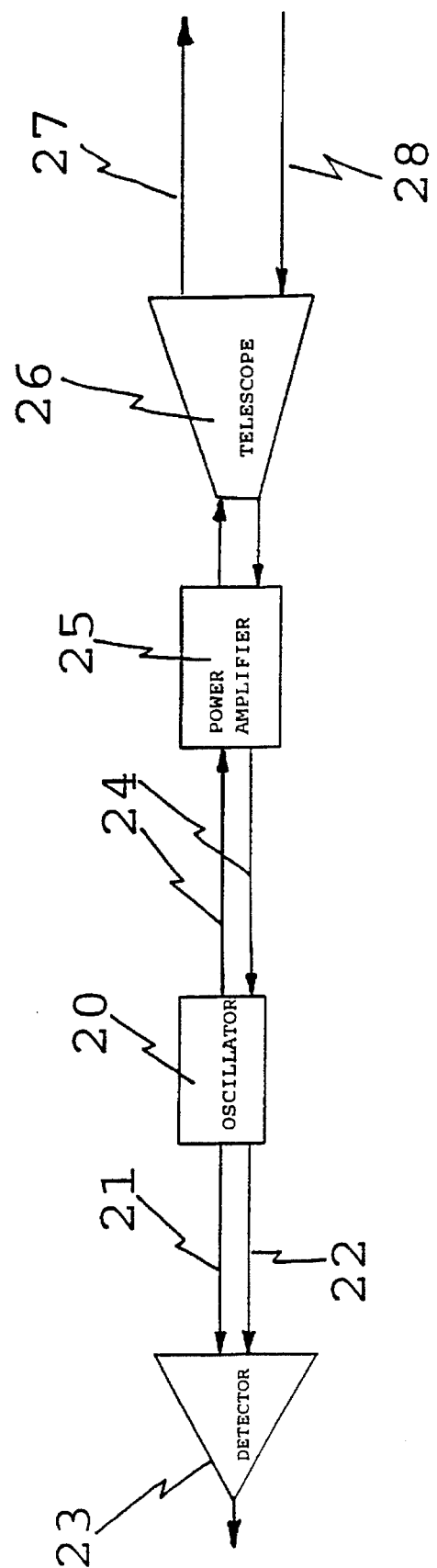
FIG. 2 is a laser radar configuration utilizing the resonator cavity of FIG. 1.

In the configuration of FIG. 2 the laser resonator cavity of the present invention is utilized as master oscillator 20 which functions as the master oscillator seed for injection locking a pulsed power amplifier in a master oscillator power amplifier configuration. Master oscillator 20 emits at one end LO beam 21 and amplified received beam 22 which is detected by detector 23. Detector 23 can be a standard silicon or InGa/PIN or APD. At the other end of master oscillator 20 there is emitted seed beam 24 which is amplified by power amplifier 25 so as to be transmitted though telescope 26 as transmitted beam 27. Received radiation beam 28 is received through telescope 26 and back through power amplifier 25 to be input as received beam into master oscillator 20. The configuration shown in FIG. 2 allows for range gating and/or time programmed gain control of the receiver to reduce noise due to narcissus and near-field atmospheric backscatter that occurs for a continuous wave (CW) laser. There is also provided a large single pass gain for the received beam as it passes through the power amplifier to offset any losses incurred by passing through both partial mirrors.

While this invention has been described in terms of preferred embodiment consisting of a laser radar application, those skilled in the art will recognize that the invention can be practiced with modification within the spirit and scope of the appended claims.

Having thus described my invention, what We claim as new and desire to secure by Letters Patent is as follows:

1. A laser resonator cavity configuration for the substantial elimination of multi-moding and resulting in a local oscillator (LO) and received beam alignment insensitivity, including:

a pair of cavity end partial reflectors on an optical axis which define a resonator cavity;

a laser rod within the cavity on the optical axis;

a means for pumping the lasing rod to produce an unpolarized spontaneous emission in all directions;

a pair of polarizers, on the optical axis within the resonator cavity, for polarizing the unpolarized spontaneous emission in a first polarization direction which is partially reflected toward opposite directions by the cavity reflectors and passed back through its respective polarizer without any change in polarization state as a counterpropagating wave, with all radiation not polarized in the first polarization direction reflected out of the resonator cavity;

a pair of magneto-optic polarization rotators on the optical axis, each inbetween the laser rod and the respective polarizer, which rotates each counterpropagating wave in a polarization direction by 45 degrees to the perpendicular of the optical axis such that the counterpropagating waves' direction of polarization are still crossed with respect to each other, each resultant counterpropagating wave stimulates laser emission as a stimulating wave that is co-polarized with and propagating in the same direction as the stimulating wave as each wave propagates through the laser rod, and as the resultant counterpropagating wave propagates towards an end reflector, the resultant counterpropagating wave passes through the magneto-optic polarization rotator which rotates the polarization by 45 degrees so that each waves' polarization is in the first direction for transmission through the polarizer, such that there is building up laser emission in the resonator cavity as long as gain in the laser rod is greater than cavity losses, so that out of one cavity resonator end is emitted LO and received beams, and out of the other cavity end is emitted transmitted and received beams, thereby resulting in the substantial elimination of multi-moding and also resulting in a local oscillator (LO) and received beam alignment insensitivity.

2. A laser resonator cavity technique for the substantial elimination of multi-moding and resulting in a local oscillator (LO) and received beam alignment insensitivity, including the steps of:

a) applying pump energy to a lasing rod within a resonator cavity to produce an unpolarized spontaneous emission in all directions;

b) polarizing the unpolarized spontaneous emission in a first polarization direction;

c) partially reflecting toward opposite directions by cavity end partial reflectors and passed back through its respective polarizer without any change in polarization state as a counterpropagating wave, with all radiation not polarized in the first polarization direction reflected out of the resonator cavity;

d) rotating each counterpropagating wave in a polarization direction by 45 degrees to the perpendicular of the optical axis such that the counterpropagating waves' direction of polarization are still crossed with respect to each other;

e) propagating each resultant counterpropagating wave which stimulates laser emission that is co-polarized with, and propagating in the same direction as, the stimulating wave as each counterpropagating wave propagates through the laser rod, and as the resultant counterpropagating waves propagate towards an end reflector, f) propagating the resultant counterpropagating wave through the magneto-optic polarization rotator which rotates the polarization by 45 degrees so that each waves' polarization is in the first direction for transmission through the polarizer;

g) repeating steps c through f, building up laser emission in the resonator cavity as long as gain in the laser rod is greater than cavity losses, so that out of one cavity resonator end is emitted LO and received beams, and out of the other cavity end is emitted transmitted and received beams, thereby resulting in the substantial elimination of multi-moding and also resulting in a local oscillator (LO) and received beam alignment insensitivity.

* * * * *